United States Patent
Wang et al.

(10) Patent No.: US 8,709,302 B2
(45) Date of Patent: *Apr. 29, 2014

(54) NICKEL-COBALT-MANGANESE MULTI-ELEMENT LITHIUM ION BATTERY CATHODE MATERIAL WITH DOPANTS AND ITS METHODS OF PREPARATION

(75) Inventors: Jiaxiang Wang, Chengdu (CN); Kaiping Wu, Chengdu (CN); Xiaobing You, Chengdu (CN); Pin Xu, Chengdu (CN); Yu Wang, Chengdu (CN); Yun Lu, Chengdu (CN); Rulan Liao, Chengdu (CN)

(73) Assignee: Chengdu Jingyuan New Materials Technology Co., Ltd., Chengdu (CN)

( * ) Notice: Subject to any disclaimer, the term of this patent is extended or adjusted under 35 U.S.C. 154(b) by 231 days.

This patent is subject to a terminal disclaimer.

(21) Appl. No.: 13/147,727

(22) PCT Filed: Jan. 29, 2010

(86) PCT No.: PCT/CN2010/070428
§ 371 (c)(1),
(2), (4) Date: Aug. 3, 2011

(87) PCT Pub. No.: WO2010/091611
PCT Pub. Date: Aug. 19, 2010

(65) Prior Publication Data
US 2011/0291044 A1     Dec. 1, 2011

(30) Foreign Application Priority Data

Feb. 13, 2009 (CN) .......................... 2009 1 0058331

(51) Int. Cl.
*H01B 1/02*     (2006.01)
*H01M 4/13*     (2010.01)

(52) U.S. Cl.
USPC ................ 252/521.2; 252/519.1; 429/231.95; 429/223; 429/224

(58) Field of Classification Search
USPC ............ 252/182.1, 521.2, 519.1; 429/231.95, 429/223, 224
See application file for complete search history.

(56) References Cited

FOREIGN PATENT DOCUMENTS

| CN | 1514502 | A | | 7/2004 |
|----|---------|---|---|--------|
| CN | 1787258 | A | | 6/2006 |
| CN | 101510603 | | * | 8/2009 |
| JP | 2006269308 | A | | 10/2006 |

* cited by examiner

*Primary Examiner* — Monique Peets
(74) *Attorney, Agent, or Firm* — Novick, Kim & Lee, PLLC; Allen Xue

(57) ABSTRACT

The present invention discloses a high compact density nickel-cobalt-manganese multi-element lithium ion battery cathode material with dopants and methods of its preparation. A preparation method of this battery cathode material is as follows: (A) preparing a nickel-cobalt-manganese multi-element intermediate with dopants by co-precipitation or chemical synthesis; (B) preparing a mixture by mixing said multi-element intermediate with a lithium salt; (C) pre-treating the said mixture, then adding into it polyvinyl alcohol and mixing uniformly; (D) pressing the resulting material into lumps, calcining the lumps at 800~950° C., cooling after its removal from the furnace, crushing, passing through a 400 mesh sieve; (E) calcining the resulting power at 700~800° C., cooling after its removal from the furnace, crushing and sieving to obtain a product. The lithium battery cathode material obtained using the above-described method has the formula $LiNi_xCo_yMn_zM_{(1-x-y-z)}O_2$. The cathode material has non-agglomerated single crystal particles. The material has a particle size ranging from 0.6~30 μm, a compact density of 3.5~3.7 g/cm³, and an initial discharge capacity of 150~165 mAh/g, with excellent cycling and safety performance.

7 Claims, 3 Drawing Sheets

NICKEL-COBALT-MANGANESE MULTI-ELEMENT LITHIUM ION BATTERY CATHODE MATERIAL WITH DOPANTS AND ITS METHODS OF PREPARATION

THE TECHNICAL FIELD

The present invention discloses a nickel-cobalt-manganese multi-element lithium ion battery cathode material with dopants and its preparation methods, which pertains to the technology field of materials in energy technology.

BACKGROUND

Nowadays the lithium-ion batteries used in mobile phones and notebook computers often have lithium cobalt oxide as the cathode material. Lithium cobalt oxide has an initial discharge capacity of 140~145 mAh/g and has a good cycling performance. It has been widely used as the cathode material for lithium ion batteries since 1992. After years of continuous improvement, lithium cobalt oxide cathode material can have a compact density that reaches 3.6~3.8 g/cm$^3$, which meets the per unit volume of capacity requirement for the laptop batteries. However, due to shortage of cobalt, lithium cobalt oxide material is expensive. It also suffers from deficiencies including difficulty in further improving capacity, poor safety performance, etc. In order to find high performance, low price lithium-ion battery cathode materials, researchers domestically and abroad conducted extensive research in the preparation of cathode materials such as lithium manganese oxide, lithium nickel oxide, etc. Lithium manganese oxide has a relatively low discharge capacity. Its cycling performance, especially that under high temperature, is relatively poor, which greatly restricted its application. Currently lithium manganese oxide is mainly used in small power batteries. Synthesis of lithium nickel oxide is relatively difficult, which are still in the development stage.

Lithium nickel cobalt manganese oxide multi-element cathode materials (hereinafter referred to the "multi-element cathode material") is a new high capacity lithium-ion battery cathode material. This material has good safety performance, lower price, good compatibility with the electrolyte, and good cycling performance. However, the synthesis of this material is rather difficult. The material produced are relatively unstable. Its tap density and compact density are much lower than that of lithium cobalt oxide, which hinders the practical application of this material. In recent years, after extensive research, the preparation of multi-element cathode material has made great progress, having developed polycrystalline (mostly spherical) nickel-cobalt-manganese multi-element cathode material. Observation under the microscope shows that the particle of the multi-element cathode material is made from a number of tiny particles agglomerated together. The tap density of this multi-element cathode materials is up to 2.0~2.5 g/cm$^3$. Its initial discharge capacity is 140~145 mAh/g. The current consensus is that the polycrystalline particles is the best structure for the nickel-cobalt-manganese multi-element cathode material. Multi-element lithium nickel cobalt manganese oxide cathode materials produced by domestic and foreign manufacturers are all in forms of polycrystalline particles. However, the preparation of polycrystalline multi-element lithium nickel cobalt manganese is complex. Although the resulting material has a relatively high tap density (up to about 2.4 g/cm) and a compact density of up to 3.2~3.4 g/cm$^3$, it is difficult to further improve upon. Furthermore, the polycrystalline particle made from a number of small particles has difficulties to maintain an uniform particle diameter, the particle size distribution is rather broad. During manufacturing process of battery cathode, the small particles may fall off from the polycrystalline particle, which leads to a lower stability of the product. In addition, spherical polycrystalline particles has relatively large absorption of moisture, which affects the performance of the product during operation. Therefore, the polycrystalline nickel-cobalt-manganese multi-element cathode material is difficult to find practical applications in high end products (such as laptop computer batteries, etc.).

SUMMARY OF INVENTION

The objective of the present invention is to overcome the deficiencies in existing technologies identified above and to provide a nickel-cobalt-manganese multi-element lithium ion battery cathode material with dopants that has a high compact density, low moisture absorption, good thermal stability, and high energy capacity. Another objective of the present invention is to provide methods of preparation for a nickel-cobalt-manganese multi-element lithium ion battery cathode material with dopants.

To achieve the above objectives, the present invention provides the following technical solutions. A nickel-cobalt-manganese multi-element lithium ion battery cathode material with dopants that has a chemical formula of $LiNi_xCo_yMn_zM_{(1-x-y-z)}O_2$, in which M is one or more of molybdenum, chromium, germanium, indium, strontium, tantalum, magnesium, or rare earth elements. The values of x, y, z are: $0.37<x<0.55$, $0.27<y<0.35$, $0.17<z<0.22$. The battery cathode material is non-agglomerated single grain particles with a compact density of 3.5-3.7 g/cm$^3$ and a diameter of 0.6-30 μm. The content of M is 0.11%-0.3% of a total mass of nickel, cobalt, and manganese. The mass fraction of M is the molar mass fraction of metal dopants, which are not nickel, cobalt, and manganese, in the total metal elements (excluding lithium) in the battery cathode material.

The preparation method for the above described lithium nickel cobalt manganese oxide cathode material include the following steps:

(1) preparing a nickel-cobalt-manganese multi-element intermediate:

obtaining an aqueous solution that contains nickel sulfate or nitrate, cobalt sulfate or nitrate, and manganese sulfate or nitrate; adding to the solution one or more chosen from a molybdenum salt, a chromium salt, a germanium salt, an indium salt, a strontium salt, a tantalum salt, a magnesium salt, or a salt of a rare earth; stirring the solution to dissolve the salt; obtaining a multi-element solution for metal salts, in which a total molar concentration of the metal is 0.8-1.3 mol/L, and a molar ratio of Ni:Co:Mn=(1.89-3.06):(1.5-2.1): (1-1.2), wherein a total mass percentage of dopants molybdenum, chromium, germanium, indium, strontium, tantalum, magnesium or rare earth elements, etc. is 0.11%-0.3% of a total mass of nickel, cobalt, and manganese;

at 40° C.-70° C. temperature, adding the above-described metal salt solution at the speed of 5-30 mL/min into an alkaline solution having polyethylene glycol 6000, NaOH, and $NH_3$ to react, or adding into an oxalate solution having polyethylene glycol 6000 to react; after completing the addition of the solution, continuing to stir for 1-2 h, then letting stand for 1-4 h; filtering to obtain a solid; washing the solid with deionized water, wherein the amount of water is 7-13 times the weight of the intermediate, so that after washing a mass percentage of alkali metal in the solid is less than 0.01%;

drying the solids after washing at 105° C.-120° C. for 3~5 h to obtain a nickel-cobalt-manganese multiple-element intermediate;

(2) mixing the nickel-cobalt-manganese multi-element intermediate with a lithium salt uniformly according to a ratio of Li:(Ni+Co+Mn)=1.05-1.1:1; grinding the mixture for 2-8 h; pre-treating it for 2 h at 500° C.-550° C.; adding polyvinyl alcohol into the pre-treated material, mixing evenly, pressing the resulting mixture into lumps, wherein the mass percentage of the added polyvinyl alcohol is 0.98%-2% of the total mass of nickel, cobalt, and manganese;

(3) placing the material in lumps into a furnace, calcining the material in lumps at 800° C.-950° C. for 15-23 h, removing said material from the furnace, cooling it to 45° C.~55° C., crushing said material and passing it through a 400 mesh sieve;

(4) placing the material passes through a 400 mesh sieve into a ceramic plate, placing it in a furnace, calcining at 700° C.-820° C. for 6-8 h, removing from the furnace, cooling to 45° C.-55° C., crushing the material, passing it through a 400 mesh sieve, the material that passes through the sieve is the non-agglomerated single grain crystal multi-element cathode material.

In the step of making the nickel-cobalt-manganese intermediate, the amount of polyethylene glycol 6000 is 0.4%-1.52% of the total mass of nickel, cobalt, and manganese.

The above-described mixed alkaline has a pH value of larger than 8, in which the molar concentration of NaOH is 0.02-0.9 mol/L and the molar concentration of ammonia 0.01-0.9 mol/L. The amount of alkaline solution is 1.04-1.1 times the stoichiometric value based on the chemical reaction equation. The above-described oxalate solution has a molar concentration of 0.8-1.2 mol/L of ammonium oxalate or potassium oxalate solution. The amount of oxalate is 1.05-1.1 times of the stoichiometric value based on the chemical reaction equation.

The lithium nickel cobalt manganese oxide cathode material can also be prepared by the following method:

(1) preparing an aqueous solution having organic acid of nickel, cobalt, and manganese; adding into the solution one or more of a salt of molybdenum, a salt of chromium, a salt of germanium, a salt of indium, a salt of strontium, a salt of tantalum, a salt of magnesium, or salts of rare earth elements, stirring the solution to dissolve the salt, obtaining a multi-metal salt solution having a total metal molar concentration of 1.2-5 mol/L, wherein said multi-metal salt solution having a molar ratio of Ni:Co:Mn=(1.89-3.06):(1.5-2.1):(1-1.2), wherein a total mass of molybdenum, chromium, germanium, indium, strontium, tantalum, magnesium or rare earth elements is 0.11%-0.3% of the total mass of nickel, cobalt, and manganese;

(2) adding a lithium salt into the multi-metal salt solution according to a molar ratio of Li:(Ni+Co+Mn)=1.05-1.1:1, stirring sufficiently, mixing uniformly, heating the mixture to 100° C.-110° C. and evaporating the liquid to obtain a slurry material, calcining the slurry material at the temperature of 520° C.-580° C. for 25-35 min, obtaining a powder material;

adding polyvinyl alcohol into the power material, wherein the mass of the polyvinyl alcohol is 0.98%-2% of total mass of the nickel, cobalt, and manganese; mixing uniformly; grinding for 2-4 h, pressing the grinded material into a lump of material;

(3) placing the material lumps into a furnace, calcining at 800° C.-950° C. for 15-23 h, removing from the furnace, cooling to 45° C.-55° C., crushing the material, passing through a 400 mesh sieve;

(4) placing the material that passes through the sieve in a ceramic plate, and put it in a furnace, calcining at 700° C.-820° C. for 6-8 h; removing it from the furnace, cooling to 45° C.~55° C., crushing, passing it through a 400 mesh sieve, the material that passes through the sieve is the non-agglomerated single grain crystal multi-element cathode material.

The organic acid salt of nickel, cobalt, manganese described above are acetate or citrate. The shape of non-agglomerated single grain crystal of the multi-element cathode material can be square, rectangular, diamond, or irregular polygon shapes.

Compared with the existing technologies, the advantages of the invention include: the preparation of the nickel-cobalt-manganese multi-element lithium ion battery cathode material with dopants is easier to control in comparison with the existing methods. During the preparation, polyethylene glycol 6000 can act a good dispersant, adding polyvinyl alcohol makes it easier to press the material into a form. The present invention provides a nickel-cobalt-manganese multi-element lithium ion battery cathode material with dopants that is in the form of non-agglomerated single grain crystals with diameter of 0.6~30 μm, a relatively high compact density of 3.5-3.7 g/cm$^3$. The pressing of electrode wafer does not produce small particles therefore avoiding small particles falling off. The present invention breaks the long-held belief of people, overcomes the above-described restrictions of crystalline structure, provides a nickel-cobalt-manganese multi-element lithium ion battery cathode material with dopants having a higher stability than polycrystalline materials when pressed and is non-agglomerated single grain crystal in form. This material has a rather high compact density, low absorption of moisture, and an initial discharge capacity of 150~165 mAh/g, and has excellent cycling performance and safety performance.

DESCRIPTIONS OF DRAWINGS

DETAILED DESCRIPTION OF THE EMBODIMENT

Example 1

Figure 1:
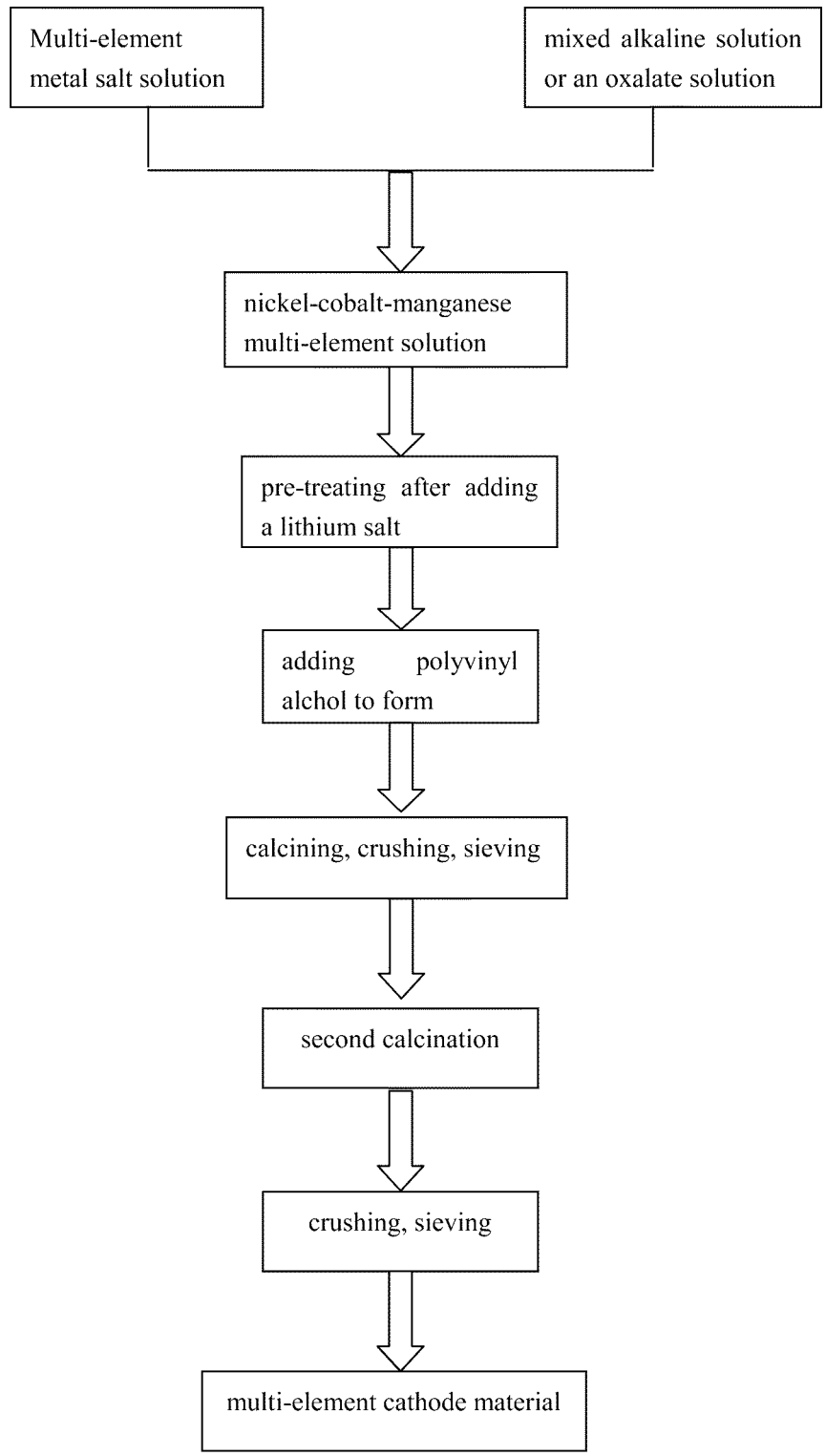
FIG. 1 is the process flow diagram for Examples 1-3 of this invention.
Figure 2:
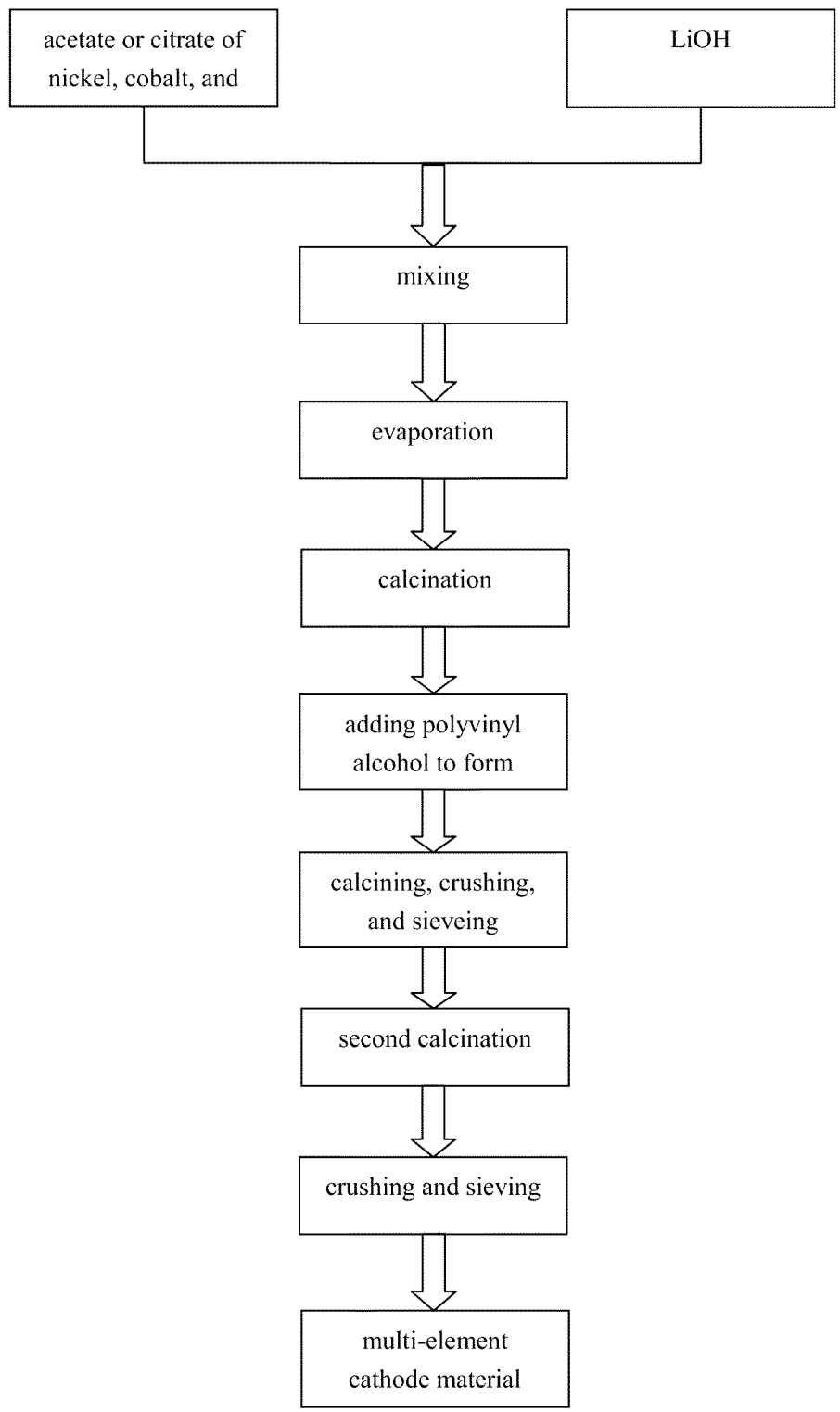
FIG. 2 is the process flow diagram for Example 4 of this invention.
Figure 3:
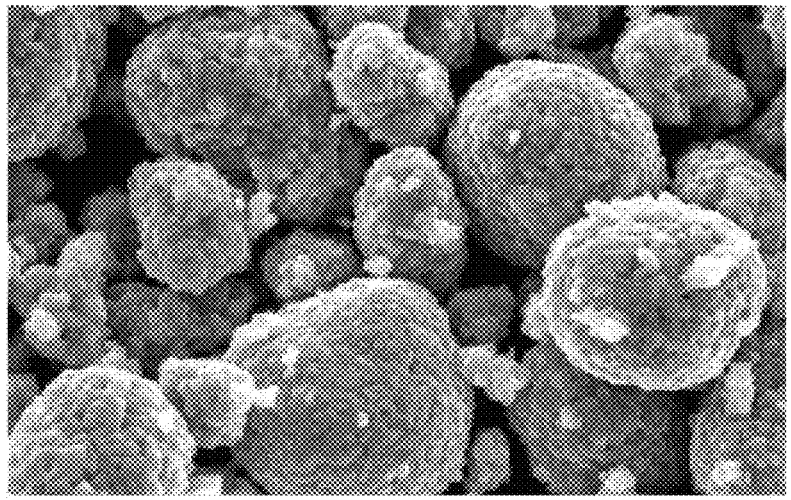
FIG. 3 is a SEM micrograph of the existing nickel, cobalt and manganese ternary material.
Figure 4:
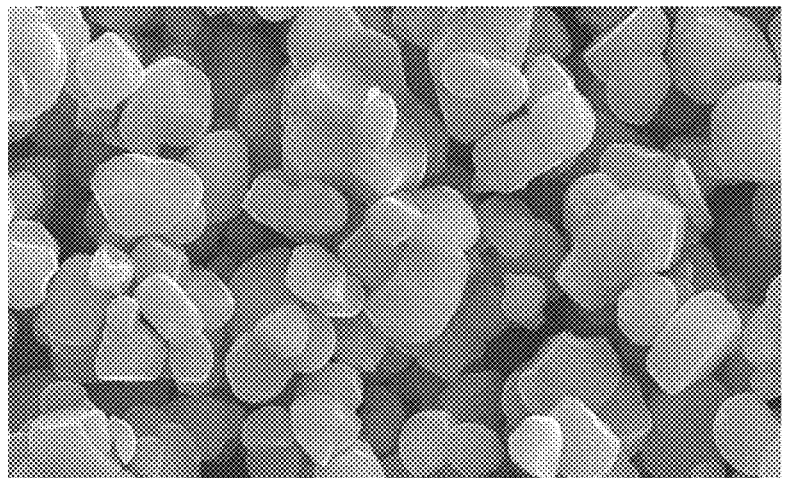
FIG. 4 is a SEM micrograph of a multi-element nickel, cobalt, manganese, lithium ion battery cathode material with dopants of the current invention.

311 g of nickel sulfate (Ni element weight percentage 21.2%), 158 g cobalt sulfate (Co element weight percentage 20.56%), 62.7 g of manganese sulfate (Mn element weight percentage 32.2%) were added in 2.2 L water. The solution was stirred, filtered, and then added to the filtrate europium nitrate (Eu element 0.03 g), dysprosium nitrate (Dy element 0.07 g), potassium tantalum (Ta elements 0.07 g), and ammonium molybdate (including Mo element 0.05 g). Stirring the solution to obtain a multi-metal salt solution (2.5 L) having a total metal molar concentration of 0.82 mol/L. The molar ratio of Ni:Co:Mn=3.06:1.50:1. The amount of dysprosium, europium, tantalum, molybdenum was 0.185% of the total mass of nickel, cobalt, and manganese.

The temperature of the above-described multi-metal salt solution was raised to about 70° C., then added 1.2 L of the multi-metal salt solution at the rate of 5~10 mL/min into 2 liters alkaline solution at about 45° C. The alkaline solution contained 1.8 g of polyethylene glycol 6000 (polyethylene glycol 6000 is about 1.52% of the total mass of nickel, cobalt, and manganese). The alkaline solution also contained 0.73 mol/L of $NH_3$ and 0.73 mol/L of NaOH. Further added 51 g of NaOH into the reactor, then added the rest of multi-metal salt solution into it while stirring. After the addition was completed, continued to stir the solution for 1 h and then let the solution sit for 4 h. Filtered the solution to obtain a solid material. Washed the solid material using 2 liters of pure water so that the solid contained less than 0.01% of sodium. Then placed the washed solid material into an oven to dry for 5 h at 115° C. and obtained 183 g of a nickel-cobalt-manganese intermediate.

All the obtained nickel-cobalt-manganese intermediate were mixed with 91.6 g of $LiOH.H_2O$, then grinded the mixture for 3 h. Pre-treated the mixture at 540° C. for 2 h. Then mixed the obtained mixture with 2.3 g of polyvinyl alcohol and pressed into lumps (the amount of polyvinyl alcohol was 1.9% of the total amount of nickel, cobalt and manganese).

The lumps were calcined in a furnace at 840° C. for 16 h, and then raised the temperature to 930° C. and continued to calcine for 7 h. Removed the material from the furnace and cooled to 50° C., crushed, passed it through a 400 mesh sieve. The material that passed through the sieve was placed in a ceramic plate and put in a furnace to be calcined at 820° C. for 6 h, removed from the furnace and cooled to 50° C., crushed, and passed through a 400 mesh sieve. The material that passed through the sieve was in the form of non-agglomerated single grain crystals of the nickel-cobalt-manganese multi-element lithium ion battery cathode material with dopants and weighted 192.2 g. The direct recovery rate of Ni, Co, Mn in this example was 97%.

This non-agglomerated single grain, layer-structured, multi-element cathode material had a particle diameter of 0.7-16 μm, a compact density of 3.58 g/cm$^3$. Its chemical formula is: $LiNi_{0.55}Co_{0.27}Mn_{0.179}M_{0.001}O_2$. The multi-element cathode material was mixed with an adhesive, then dried, pressed, formed, weighted, installed, sealed, and made into a battery. This battery cathode coating had the following composition: adhesive PVDF 3.5%, man-made graphite 93.6%, conductive carbon black 2.9%. The anode coating had the following composition: PVDF 6.5%, man-made graphite 93.5%. The surface area of the cathode and anode electrodes was 7 cm$^2$. Using the PCBT-138-4D program-controlled battery test instrument by Wuhan Lixing Testing Equipment Ltd. Corp. to test the battery, the initial discharge capacity of the battery was 158.7.1 mAh/g, and the capacity decay was only 2.9% after 100 charge-discharge cycles. The battery made using the existing polycrystalline cathode material at the same ratio, measuring it under the same condition, its initial discharge capacity was 143 mAh/g.

Example 2

Nickel nitrate containing 52.2 g Ni, cobalt nitrate containing 42.9 g Co, and manganese nitrate containing 25 g Mn were dissolved in 1.7 L of pure water to obtain a solution 2.1 L in volume. Then added to the solution lanthanum nitrate containing 0.04 g lanthanum, europium nitrate containing 0.06 g of europium, dysprosium nitrate containing 0.10 g dysprosium, potassium tantalum containing 0.08 g tantalum. The solution was stirred to obtain a multi-metal salt solution having a total metal molar concentration of 0.99 mol/L (2.1 L). The molar ratio Ni:Co:Mn=1.95:1.59:1. The total amount of lanthanum, dysprosium, tantalum, europium was 0.23% of the total mass of nickel, cobalt and manganese content.

The solution described above was heated to about 60° C. One liter of the multi-element metal salt solution was added to 1.64 liter of alkaline solution that contained 1.1 g polyethylene glycol 6000 (the amount of polyethylene glycol was 0.92% of the total mass of nickel, cobalt, and manganese), the alkaline solution (temperature about 45° C.) that contained 0.89 mol/L of $NH_3$ and 0.89 mol/L of NaOH. Stirred solution for 2.5 hours, then again added to the reactor 52.5 g NaOH. Continued to add the rest of the multi-element metal salt while stirring. The reaction continued. After the addition of the material was completed, continued to stir for 2 hours. The solution was let sit for 2 hours, filtrated to obtain a solid. The intermediate material obtained was washed using 1.8 liters of pure water and then placed in an oven to dry at 105-115° C. for 4 h to obtain a nickel-cobalt-manganese intermediate of 186.1 g.

The multi-element intermediate was mixed with 91.1 g $LiOH.H_2O$ (molar ratio Li:Ni+Co+Mn was 1.06:1), grinded for 4 h, pretreated at 500° C. for 2 hours. The pretreated material was mixed uniformly with 1.8 g polyvinyl alcohol (amount polyvinyl alcohol was 1.5% of the total mass of nickel, cobalt and manganese), mixed, pressed into lumps, and then placed in a furnace to calcine at 830° C. for 15 h. The temperature was raised again to 930° C. to calcine the material for 7 h. The material was then removed from the furnace, cooled to about 50° C., crushed, and passed through a 400 mesh sieve. The material that passed through the sieve was placed in a ceramic plate and put in a furnace to calcine at 740° C. for 7 hours. The material was removed from the furnace and cooled to about 45° C., crushed, sieved, packaged to obtain a cathode material of non-agglomerated single grain crystal particles and of a layered structure (194.5 g). The chemical formula of the material is $LiNi_{0.429}Co_{0.35}Mn_{0.22}M_{0.001}O_2$.

This cathode material of non-agglomerated single grain particles and of a layered structure has a particle size of 0.8-13 μm, a compact density of 3.59 g/cm$^3$. Its initial discharge capacity was 162.5 mAh/g and the capacity decay was only 2.3% after 100 charge-discharge cycles.

Example 3

219.3 g nickel sulphate (Ni weight percentage 21.2%), 250.6 g of cobalt sulfate (Co weight percentage 20.56%), 71.2 g of manganese sulfate (Mn weight percentage 32.2%) was dissolved in 1.3 liters of pure water. The solution was stirred to dissolve the salts, filtered, and then into the filtrate added dysprosium nitrate (containing 0.1 g Dy), neodymium nitrate (containing 0.11 g Nd), sodium molybdate (containing 0.07 g Mo), potassium tantalum (containing 0.07 g Ta). The solution was stirred to dissolve the salt to obtain 1.8 L of multi-metal salt solution having a total molar concentration of metal 1.16 mol/L. The molar ratio in the solution was Ni:Co:Mn=1.9:2.1:1. The amount of dysprosium, neodymium, molybdenum, tantalum was 0.29% of the total mass of nickel, cobalt, and manganese.

The solution described above was heated to 45° C. This solution was added at the rate of about 30 mL/min to 2 liters of potassium oxalate solution. The potassium oxalate solution (temperature at about 50° C.) had a molar concentration of 1.1 mol/L, which contained 0.5 g polyethylene glycol 6000 (the amount of polyethylene glycol was 0.41% of total mass of nickel, cobalt and manganese, the amount of oxalate was 105% of the stoichiometric value). After the addition of material was completed, the solution was continued to be stirred for 1 hour, and let sit for 1 h, filtered to obtain a solid. The solid was washed using 1.5 liters of pure water then dried at 120° C. for 3 h to obtain 306.1 g nickel-cobalt-manganese multi-element intermediate.

The nickel-cobalt-manganese multi-element intermediate obtained was mixed with 94.8 g LiOH.H$_2$O (ratio between Li and Ni+Co+Mn molar 1.11:1), grinded, and calcined at about 520° C. for 2 hours. Then the material was mixed with 1.2 g of polyvinyl alcohol (amount of polyvinyl alcohol was 0.99% of the total mass of nickel, cobalt and manganese), then mixed and pressed into lumps. The lumps of material were placed in a furnace and calcined at 830° C. for 12 h, then heated to 930° C. to calcine for 8 h, then removed from the furnace, crushed, and passed through a 400 mesh sieve. The material that passed through the sieve was placed in a ceramic plate and calcined at 740° C. for 8 h, then removed from the furnace and cooled to about 55° C., crushed, and passed through a 400 mesh sieve. The material that passed through the sieve was packaged to obtain the multi-element cathode material in the form of non-agglomerated single grain particles and of a layered structure (197 g). The direct recovery rate of Ni, Co, and Mn in this example was 97.4% respectively.

The multi-element cathode material in the form of non-agglomerated single grain particles and of a layered structure had a chemical formula of LiNi$_{0.3798}$Co$_{0.419}$Mn$_{0.20}$M$_{0.0012}$O$_2$, a diameter of 1~15 μm, a compact density of 3.66 g/cm$^3$. The initial discharge capacity was 164.7 mAh/g (4.2 V) and 192.3 mAh/g (4.5 V). The capacity decay after 100 charge-discharge cycles was only 2.6%.

Example 4

Nickel citrate containing 59.4 g Ni, cobalt acetate containing Co 35.8 g Co, manganese acetate containing 22.2 g Mn were dissolved in 1 L of pure water to obtain a solution of 1.3 L in volume. The molar ratio of nickel, cobalt and manganese was Ni:Co:Mn=2.5:1.5:1, and then added to the solution neodymium nitrate containing 0.06 g neodymium, europium nitrate containing 0.04 g europium, ammonium molybdenum containing 0.03 g molybdenum. The solution was stirred to mix uniformly and into which further added 93.8 g LiOH.H$_2$O (molar ratio of Li and Ni+Co+Mn of 1.1:1). The solution stirred sufficiently and then evaporated at 100-110° C. into a paste of material.

The paste was then fired at 550° C. for about 30 minutes to obtain an intermediate powder of 196.8 g. The amount of neodymium, europium, molybdenum was 0.11% of the total mass of nickel, cobalt, and manganese.

The above described intermediate powder was mixed uniformly with 1.3 g of polyvinyl alcohol (amount of polyvinyl alcohol was 1.1% of the mass of nickel, cobalt and manganese), pressed into lumps of material. The lumps were placed in a furnace and calcined at 900° C. for 16 h and then removed from the furnace, cooled to 50° C., crushed, and passed through a 400 mesh sieve. The material that passed through the sieve was placed in a ceramic plate and calcined at 700° C. for 8 h, removed from the furnace, cooled to 50° C., crushed, passing through a 400 mesh sieve. The material that passed through the sieve was packaged and obtained a multi-element cathode material of non-agglomerated single grain particles and of a layered structure. (195.4 g). In this case the direct recovery rate of Ni, Co, Mn was 99.1%.

The multi-element cathode material had a chemical formula: LiNi$_{0.5}$Co$_{0.3}$Mn$_{0.1995}$M$_{0.0005}$O$_2$. The multi-element cathode material of non-agglomerated single grain particles and of a layered structure had a particle diameter of 0.8-11 μm, a compact density of 3.64 g/cm$^3$. Its initial discharge capacity was 164.5 mAh/g (4.2 V) and the capacity decay after 100 charge-discharge cycles was only 2.2%.

We claim:

1. A method of preparing a nickel-cobalt-manganese multi-element lithium ion battery cathode material, comprising the steps of:
   (1) preparing a nickel-cobalt-manganese multi-element intermediate, comprising:
       dissolving salts of nickel, cobalt, and manganese in water to obtain an aqueous solution;
       adding one or more salts selected from the group consisting of a molybdenum salt, a chromium salt, a germanium salt, an indium salt, a strontium salt, a tantalum salt, a magnesium salt, and a salt of a rare earth element to the aqueous solution;
       stirring the solution to dissolve the salts,
       wherein the resulting solution has a total molar concentration of metal elements of 0.8-1.3 mol/L, and a molar ratio of Ni:Co:Mn=(1.89-3.06):(1.5-2.1):(1-1.2), wherein a total mass percentage of molybdenum, chromium, germanium, indium, strontium, tantalum, magnesium or rare earth elements is 0.11%-0.3% of a total mass of nickel, cobalt, and manganese,
       adding the above-described metal salt solution at a speed of 5-30 mL/min at a temperature in the range of 40° C. to 70° C. into an alkaline solution having polyethylene glycol, NaOH, and NH$_3$, or into an oxalate solution having polyethylene glycol to obtain a reaction solution;
       stirring the reaction solution for 1-2 h, then letting stand for 1-4 h;
       filtering the reaction solution to obtain a solid;
       washing the solid with deionized water to obtain a solid having a mass percentage of alkali metal in the solid of less than 0.01%;
       drying the solids after washing at 105° C.-120° C. for 3-5 h to obtain the nickel-cobalt-manganese multiple-element intermediate;
   (2) mixing the multi-element nickel-cobalt-manganese intermediate with a lithium salt uniformly according to a ratio of Li:(Ni+Co+Mn)=1.05-1.1:1 to obtain a first mixture;
       grinding the first mixture for 2-8 h,
       pre-treating the grinded for 2 h at 500° C.-550° C.;
       adding polyvinyl alcohol into the pre-treated material, mixing evenly, and pressing the resulting mixture into lumps, wherein the mass percentage of the added polyvinyl alcohol is 0.98%-2% of the total mass of nickel, cobalt, and manganese;
   (3) placing the material in lumps into a furnace, calcining the material in lumps at 800° C.-950° C. for 15-23 h, removing said material from the furnace, cooling it to 45° C.-5° C., crushing said material and passing it through a 400 mesh sieve;
   (4) calcining the material that passes through a 400 mesh sieve at 700° C.-820° C. for 6-8 h, removing from the furnace, cooling to 45° C.-55° C., crushing the material, passing it through a 400 mesh sieve,
   wherein the material obtained in step (4) comprises non-agglomerated single-grain particles and has a compact density of 3.5-3.7 g/cm$^3$, the particles has a diameter of 0.6-30 μm and a chemical formula of LiNi$_x$Co$_y$Mn$_z$M$_{(1-x-y-z)}$O$_2$ wherein M is one or more of molybdenum, chromium, germanium, indium, strontium, tantalum, magnesium, or rare earth elements, the values of x, y, z are: $0.37 \leq x \leq 0.55$, $0.27 \leq y \leq 0.35$, $0.17 < z < 0.22$, a content of M is 0.11%-0.3% of a total mass of nickel, cobalt, and manganese.

2. The method of claim 1, characterized in that: the intermediate step of making the nickel-cobalt-manganese employing an amount of polyethylene glycol having a mass percentage of 0.4%-1.52% of the total mass of nickel, cobalt, and manganese.

3. The method of claim 1, characterized in that the alkaline solution of NaOH and $NH_3$ has a pH value larger than 8.

4. The method of claim 1 or claim 3, characterized in that the amount of alkaline solution mixture is 1.04-1.1 times the stoichiometric value calculated based on a reaction equation.

5. The method of claim 1, characterized in that the oxalate solution has a molar concentration of 0.8-1.2 mol/L of ammonium or potassium oxalate.

6. The method of claim 1 or claim 5, characterized in that the amount of oxalate solution is 1.05-1.1 time the stoichiometric value calculated based on a chemical reaction equation.

7. The method of claim 1, characterized in that the salts for nickel, cobalt, manganese are selected from the group consisting of acetate salts, citrates, sulfates, and nitrates.

* * * * *